United States Patent
Lockwood

(10) Patent No.: US 8,356,843 B2
(45) Date of Patent: Jan. 22, 2013

(54) REFRIGERATION SYSTEM CONNECTION FITTING

(75) Inventor: William T. Lockwood, Windsor Locks, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 80 days.

(21) Appl. No.: 12/891,015

(22) Filed: Sep. 27, 2010

(65) Prior Publication Data

US 2012/0073323 A1    Mar. 29, 2012

(51) Int. Cl.
F16L 23/00    (2006.01)

(52) U.S. Cl. .................................. 285/354; 285/917

(58) Field of Classification Search .............. 285/354, 285/917, 331, 95
See application file for complete search history.

(56) References Cited

U.S. PATENT DOCUMENTS

| | | | |
|---|---|---|---|
| 2,458,817 A * | 1/1949 | Wolfram ..................... 285/328 |
| 2,838,328 A * | 6/1958 | Rohrberg ..................... 277/645 |
| 2,976,066 A | 3/1961 | Antoniades et al. |
| 3,082,609 A * | 3/1963 | Ryan et al. ..................... 62/89 |
| 3,163,431 A | 12/1964 | Tanner |
| 3,337,181 A * | 8/1967 | Wennerstrom ............... 251/148 |
| 3,492,834 A | 2/1970 | Grantham |
| 3,759,552 A | 9/1973 | Levinsohn et al. |
| 3,879,070 A | 4/1975 | Russ |
| 3,994,516 A | 11/1976 | Fredd |
| 4,374,469 A * | 2/1983 | Rannenberg ..................... 62/402 |
| 4,468,309 A * | 8/1984 | White ..................... 427/528 |
| 4,477,087 A | 10/1984 | Sutter, Jr. et al. |
| 4,603,892 A * | 8/1986 | Abbes et al. ..................... 285/336 |
| 4,811,976 A * | 3/1989 | Yagisawa ..................... 285/328 |
| 4,934,742 A | 6/1990 | Williamson |
| 5,002,316 A * | 3/1991 | Chohan ..................... 285/110 |
| 5,050,914 A * | 9/1991 | Miyashita ..................... 285/336 |
| 5,060,988 A | 10/1991 | Williamson |
| 5,118,141 A * | 6/1992 | Miyashita ..................... 285/336 |
| 5,160,178 A * | 11/1992 | Iwabuchi ..................... 285/328 |
| 5,283,951 A * | 2/1994 | Davenport et al. ...... 29/890.144 |
| 5,339,861 A | 8/1994 | Smith, III |
| 5,351,998 A | 10/1994 | Behrens et al. |
| 5,369,960 A * | 12/1994 | Mueller et al. ............... 62/238.6 |
| 5,482,332 A * | 1/1996 | Ohmi et al. ..................... 285/328 |
| 5,547,232 A | 8/1996 | Waterman |
| 5,669,612 A * | 9/1997 | Nicholson ..................... 277/614 |
| 5,720,505 A * | 2/1998 | Ohmi et al. ..................... 285/328 |
| 5,893,591 A * | 4/1999 | Ebel et al. ..................... 285/354 |
| 6,170,890 B1 * | 1/2001 | Ohmi et al. ..................... 285/379 |
| 6,273,477 B1 * | 8/2001 | Ohmi et al. ..................... 285/328 |
| 6,416,087 B1 * | 7/2002 | Kremer ..................... 285/328 |
| 6,443,502 B1 * | 9/2002 | Iida et al. ..................... 285/351 |
| 6,598,908 B1 | 7/2003 | Wosik |
| 6,662,587 B2 | 12/2003 | Rembold et al. |
| 6,764,109 B2 * | 7/2004 | Richardson et al. .......... 285/354 |
| 6,916,048 B2 * | 7/2005 | Ricco ..................... 285/220 |
| 6,945,569 B1 * | 9/2005 | Diaz et al. ..................... 285/388 |

(Continued)

*Primary Examiner* — Aaron Dunwoody
(74) *Attorney, Agent, or Firm* — Carlson, Gaskey & Olds, P.C.

(57) ABSTRACT

A disclosed connector assembly for a refrigerant system mounted within an aircraft includes a metal seal disposed within a seal bore of a connector and compressed against a seal face of a nipple secured to the connector by a threaded member. The connector includes a seal bore that receives the metal seal with the inner portion of the seal bore open to the bore. In one example, the connector and nut are formed from aluminum and the nipple is formed from stainless steel and includes an aluminum coating applied to surfaces in contact with the metal seal and the connector.

13 Claims, 3 Drawing Sheets

U.S. PATENT DOCUMENTS

| | | |
|---|---|---|
| 7,021,677 B2 | 4/2006 | Smith, III |
| 7,125,055 B2 * | 10/2006 | Dallas ............... 285/354 |
| 8,038,180 B2 * | 10/2011 | Williams et al. ......... 285/353 |
| 2003/0122377 A1 | 7/2003 | Northrop et al. |
| 2004/0094959 A1 * | 5/2004 | Shemtov ............ 285/354 |
| 2006/0138772 A1 | 6/2006 | Galante et al. |
| 2006/0225440 A1 * | 10/2006 | Chang ............... 62/86 |
| 2007/0052234 A1 * | 3/2007 | Breay ............... 285/354 |
| 2007/0096465 A1 * | 5/2007 | Hall et al. ............ 285/342 |
| 2008/0007048 A1 | 1/2008 | Benoit et al. |
| 2011/0186497 A1 * | 8/2011 | Wagner et al. ......... 210/198.2 |

* cited by examiner

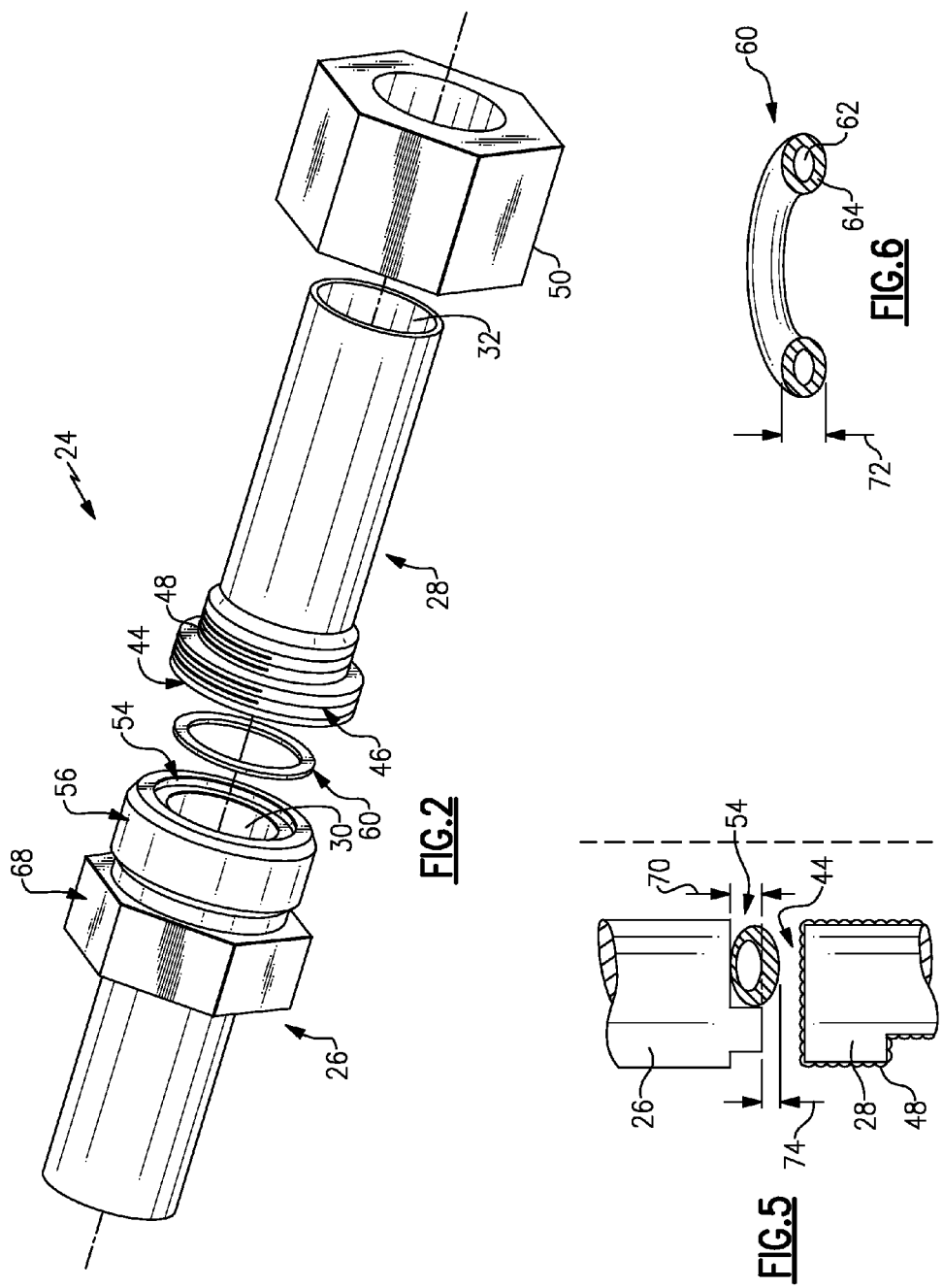

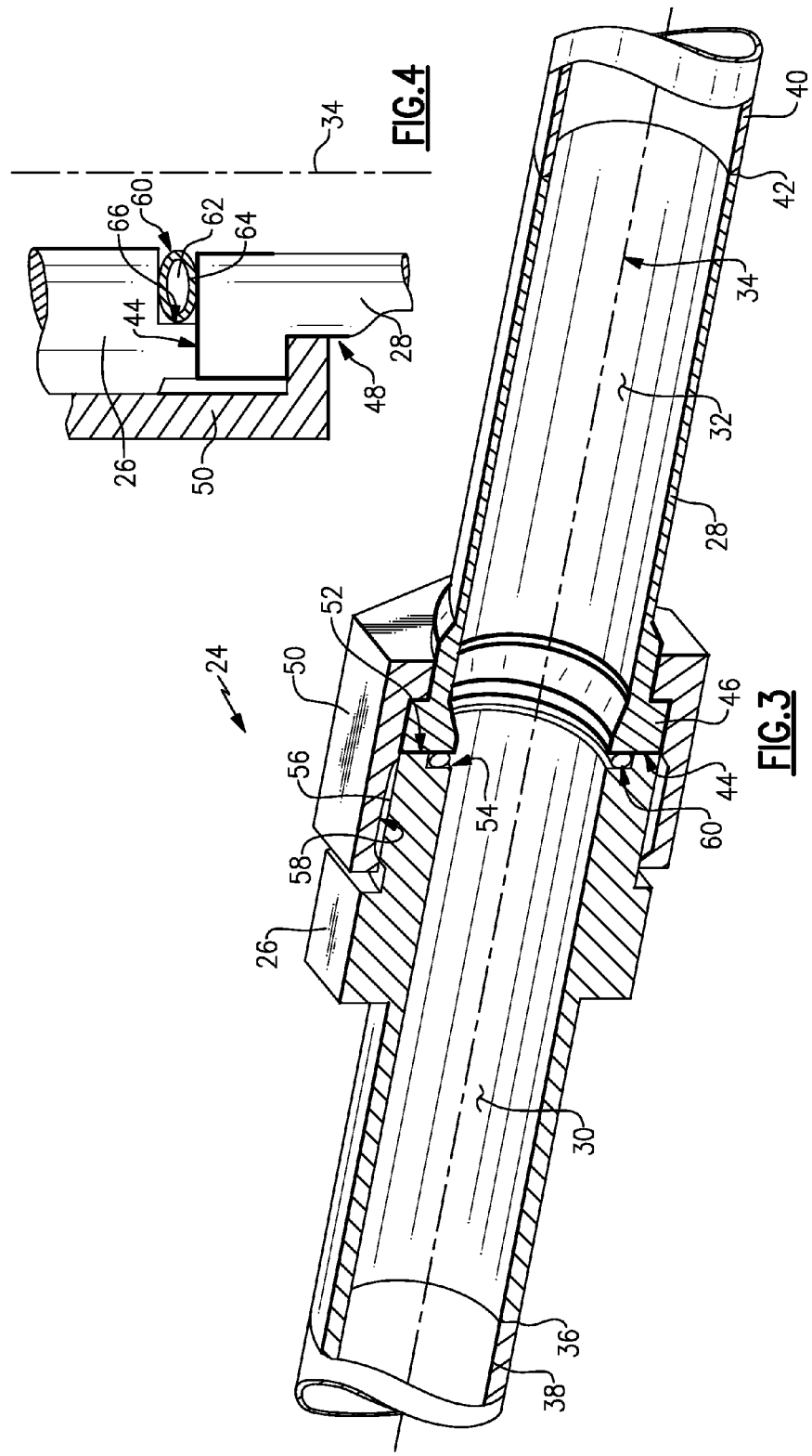

REFRIGERATION SYSTEM CONNECTION FITTING

BACKGROUND

This disclosure generally relates to a connection fitting for an environment control system. More particularly, this disclosure relates to a connection fitting for a refrigerant conduit subject to extreme environmental conditions.

An air vehicle experiences extreme conditions during a normal operating sequence. These extremes conditions include fluctuations from extremely low temperatures to extremely high temperatures. Additionally, systems aboard an air vehicle are required to be easily assembled and disassembled for maintenance and therefore require connection fittings between components such as conduits with a refrigeration system. Such connections are potential leak points that are required to remain sealed within specific limits during the entire operation cycle including the extreme highs and lows of temperature.

SUMMARY

A disclosed example connector assembly for a refrigerant system mounted within an aircraft includes a metal seal disposed with a seal bore of a connector and compressed against a seal face of a nipple secured to the connector by a threaded member. The connector includes a seal bore that receives the metal seal with the inner portion of the seal bore open to the bore. In one example, the connector and nut are formed from aluminum and the nipple is formed from stainless steel and includes an aluminum coating applied to surfaces in contact with the metal seal and the connector.

These and other features disclosed herein can be best understood from the following specification and drawings, the following of which is a brief description.

BRIEF DESCRIPTION OF THE DRAWINGS

FIG. 2 is an exploded view of an example connector.

FIG. 3 is a sectional view of the example connector.

FIG. 4 is an enlarged cross-section of a portion of the connector assembly.

FIG. 5 is an enlarged cross-section of a portion of the connector assembly prior to assembly.

FIG. 6 is a sectional view of an example metal seal.

DETAILED DESCRIPTION

Figure 1:
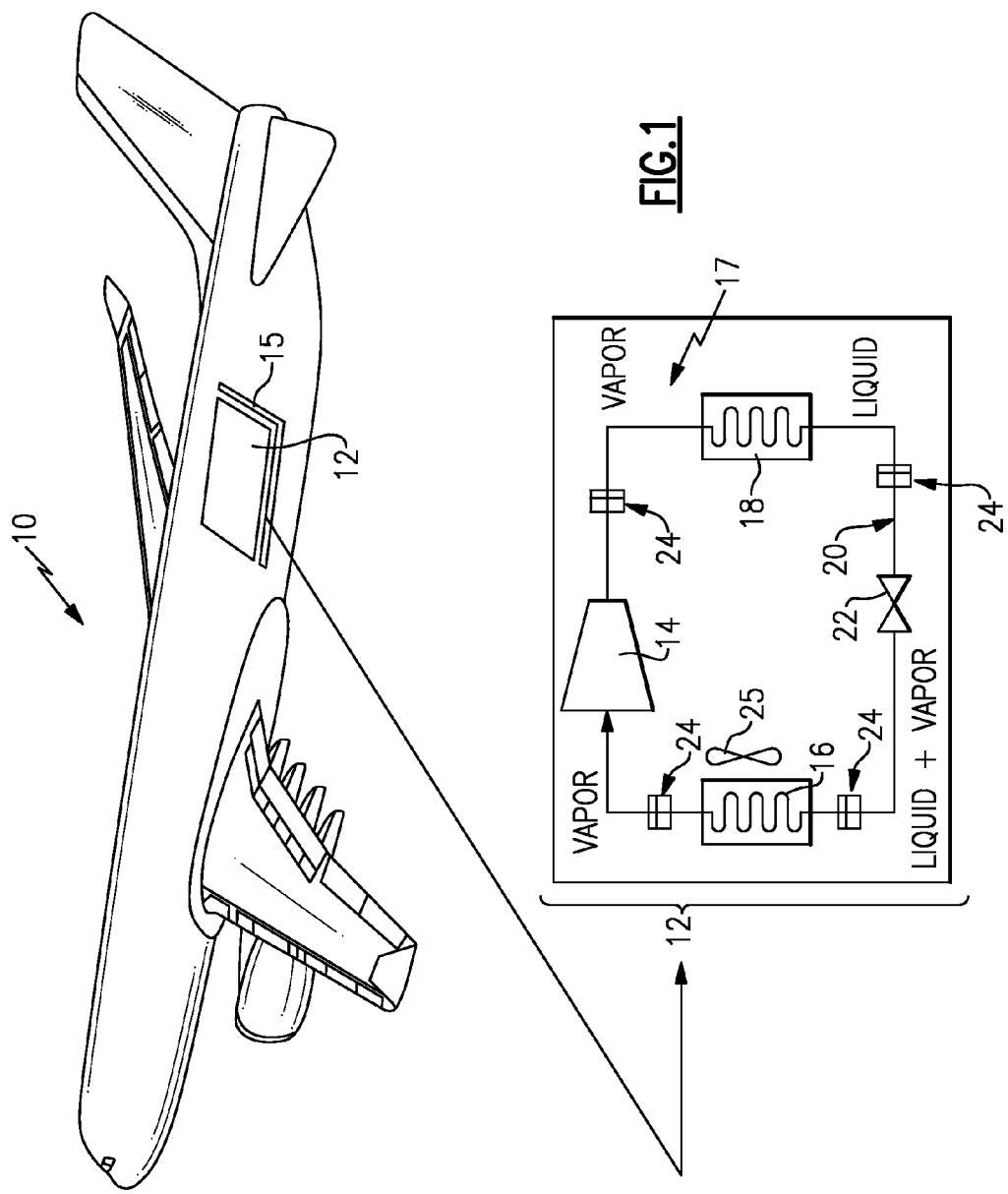
FIG. 1 is a schematic view of a refrigeration system for an aircraft.

Referring to FIG. 1, a refrigerant system 12 is schematically shown mounted within an aircraft 10 to provide cooling and environmental control functions for interior spaces of the aircraft 10. The example refrigerant system 12 is mounted to a support structure 15 within the aircraft 10. The example refrigerant system 12 defines a refrigerant circuit 17 including a compressor 14 that draws refrigerant from an evaporator 16 and compresses the refrigerant which is sent to a condenser 18 in vapor form. The refrigerant in vapor form is transformed into a liquid in the condenser 18 and directed through conduits 20 toward an expansion control valve 22. The expansion control valve 22 controls flow to control operation of the refrigerant system 12. A blower 25 is provided to generate airflow through the evaporator 16. The refrigerant is directed between the various components through corresponding conduits 20. The conduits 20 include connector assemblies 24 that provide for disassembly and inspection of the various component parts.

The environment encountered during normal flight operations includes extremes in temperature and pressures. Such temperatures can range from a low temperature down to around −70° F. (−57° C.) up to high temperatures above 300° F. (149° C.). Additionally, pressures can range from a low of around −11 psig to a high pressure above 500 psig. Furthermore, fluids and other potentially harmful liquids may be encountered within the various mounting locations within the aircraft 10. Additionally, some compressors require lubricants mixed in with the refrigerant that can be limit the life of elastomeric seals. Accordingly, the example refrigerant system 12 is provided with features for performing as desired within the operating temperature range.

The connector assemblies 24 provide for the disassembly and maintenance of the refrigerant system 12 while maintaining fluid integrity throughout the extreme operating conditions. The example connector assemblies 24 include features that prevent leakage throughout the extreme temperature range encountered by the system 12 during operation.

Referring to FIGS. 2 and 3, the connector assemblies 24 include a connector 26 that is secured to a nipple 28 by a nut 50. The connector 26 and nipple 28 define corresponding bores 30, 32 along an axis 34 that define the fluid flow path for refrigerant. A metal seal 60 is disposed between the connector 26 and nipple 28 to provide the desired fluid tight seal.

The connector 26 includes a seal bore 54 that receives the metal seal 60. The seal bore 54 is concentric with the bore 30 and includes an outer wall 66. The outer wall 66 defines the outer diameter of the seal bore 54. The inner portion of the seal bore is open to the bore 30. In other words, the seal bore 54 comprises a step in the bore 30 that provides a sealing seat for the metal seal 60.

The connector 26 includes external threads 56 that correspond with internal threads 58 of the nut 50. The nut 50 engages a shoulder 46 of the nipple 28 such that threaded engagement of the nut 50 with the threads 56 secures the nipple against an end face 52 of the connector 26. The connector 26 further includes a hex portion 68 utilized for positive engagement to a tool. Although the example nut 50 and portion 68 are depicted with a hexagonal shape, other shapes can be sued to support tool engagement.

The nipple 28 includes an end 42 that is attached to a conduit 40 of the refrigerant system 12. The attachment between the nipple end 42 and the conduit 40 can be provided by welding, brazing or any other attachment process that provides the desired strength and fluid tight integrity. The connector 26 includes back end 36 that is similarly connected to a separate conduit portion 38. The connector 26 and conduit portion 38 are attached by way of a permanent attachment process such as welding, brazing or other fluid tight bonds.

The nipple 28 includes a seal face 44 that engages the metal seal 60 disposed within the seal bore 54. The seal face 44 is substantially flat and effectively compresses the metal seal 60 to provide the desired sealing connection. The metal seal 60 is comprised of a compressible metal material that compresses under the pressure applied upon tightening of the nut 50. The pressure compresses the metal seal 60 such that imperfections on the seal bore 54 and seal face 44 are filled such that potential leakage paths through the connector are substantially eliminated.

The material selected for the connector 26 provides the desired durability and weight characteristics while also being compatible with the conduit materials. Metal to metal contact in the presence of an electrolyte can result in galvanic corrosion. In this disclosed example, the conduit 38 is formed from an aluminum material. The connector 26 that is attached to the conduit 38 is also formed from an aluminum material. The metal seal 60 is formed to include an outer coating 64 (FIG. 6) formed of aluminum material. The like aluminum material of the connector 26 and the metal seal 60 are compatible such that conditions for undesired galvanic reactions are not formed.

The conduit 40 can be formed from a stainless steel, copper or brass material and may be attached to the nipple 28 by a welding or brazing process. The nipple 28 is formed from a stainless steel material to provide the desired compatibility with the conduit 40. A coating 48 of aluminum is applied to the nipple 28 on the surfaces that come into contact with the metal seal 60 and the connector 26 to further prevent conditions for galvanic reactions. The example aluminum coating 48 is applied using known processes such as vapor deposition that can provide a desired thickness of aluminum in the localized areas that come into contact with the connector 26 and metal seal 60. Moreover, the example nut 50 is formed from aluminum material to further protect against undesired degradation of the metal seal 60 and connector assembly 24.

Referring to FIGS. 4, 5, and 6, the seal bore 54 includes a depth 70 that is less than a thickness 72 of the metal seal 60. Because the metal seal 60 is thicker than the seal bore depth 70, a portion of the metal seal 60 extends proud of the connector end face 52 a height 74 prior to assembly with the nipple 28. The seal face 44 of the nipple 28 engages the metal seal 60 and compresses the metal seal 60 (Best shown in FIG. 4) the depth 74 such that the seal face 44 of the nipple 28 abuts the end face 52 of the connector 26. The resulting compression of the metal seal 60 provides the desired seal integrity.

The example metal seal 60 comprises an inner substrate 62 surrounded and/or coated by a softer metal material. In this example, the inner substrate 62 comprises a metal Inconel material coated in an aluminum material that is softer than the Inconel substrate material. The aluminum material can include an alloy of aluminum that is compatible with both the material forming the connector 26 and the coating 48 on the seal face 44.

The metal seal 60 includes mechanical properties that are resistant to degradation caused by exposure to the extreme temperature conditions potentially encountered by the connector assembly 24. Moreover, the metal seal 60 is resistant to possible degradation caused by corrosive fluids, lubricants, solvents or other potentially harmful substances that may be encountered during operation.

The example connector assembly 24 could also be fabricated from other materials compatible with the material used for the conduits 38 and 40. Conduits 38 and 40 represent examples of conduits 20 schematically shown in FIG. 1. Forming the conduits 38, 40 from stainless steel can be utilized for systems that operate at high pressures. In such applications, the connector 26 and nipple 28 are both formed form stainless steel. The metal seal 60 is then formed with a coating of gold, silver or other soft medal that deforms to fill imperfections in the seal surfaces. In another example, the connector 26 and nipple 28 are both fabricated from aluminum material for attachment to corresponding aluminum conduits.

The example connector assemblies 24 are utilized in refrigerant system 12 that are mounted within an aircraft 10 and therefore include features that provide the desired performance and durability for extreme conditions.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An aircraft refrigerant system comprising:
    a support structure of an aircraft;
    a refrigerant circuit supported by the support structure including conduits for communicating a refrigerant between a compressor, a condenser, an expansion valve and an evaporator; and
    a connector assembly providing a connection within the refrigerant circuit, the connector assembly including;
    a connector including a bore, an end face, a seal bore and external threads, the seal bore open to the bore on a radially inward side;
    a nipple including a bore, a shoulder and a seal face;
    a securing member including internal threads for engaging the external threads of the connector for holding the end face against the seal face; and
    a metal seal received within the seal bore, the metal seal comprising a metal substrate having a coating comprising a metal material different than the substrate that is softer than the metal substrate, the metal seal disposed in sealing engagement with a surface of the seal bore and the seal face.

2. The aircraft refrigerant system as recited in claim 1, wherein the connector is formed from aluminum, the nipple is formed from stainless steel and the metal seal includes an aluminum coating.

3. The aircraft refrigerant system as recited in claim 2, wherein the nipple includes an aluminum coating on the seal face and shoulder.

4. The aircraft refrigerant system as recited in claim 1, wherein the connector and nipple are both formed from stainless steel and the metal seal includes a coating comprising one of a gold and silver material.

5. The aircraft refrigerant system as recited in claim 1, wherein the seal bore comprises a depth greater than a thickness of the metal seal.

6. The aircraft refrigerant system as recited in claim 1, wherein the metal seal comprises a substantially disk shaped member.

7. The aircraft refrigerant system as recited in claim 1, wherein the metal seal is deformable between the seal bore and the seal face of the nipple.

8. The aircraft refrigerant system as recited in claim 1, wherein the seal face comprises a substantially flat surface transverse to the bore defined through the connector and the nipple.

9. The aircraft refrigerant system as recited in claim 1, wherein the connector includes a back end attached to a conduit of the refrigerant circuit.

10. A method of installing a refrigerant system within an aircraft comprising:
    mounting a refrigerant circuit to a support member of an aircraft;
    attaching a connector to a first end of a conduit of the refrigerant circuit, wherein the connector includes a bore and a seal bore concentric with and open to the bore;
    attaching a nipple to a second end of a conduit of the refrigerant circuit, wherein the nipple includes a seal face disposed transverse to the bore;
    mounting a seal formed of metal within the seal bore defined by the connector; and
    securing the nipple to the connector to deform the metal seal within the seal bore for forming a seal between the connector and the nipple.

11. The method as recited in claim 10, including the step of forming the connector of an aluminum material and the nipple of a stainless steel material, and coating the seal face and shoulder of the nipple with an aluminum coating.

12. The method as recited in claim 10, including the step of forming an outer surface of the metal seal from an aluminum material.

13. The method as recited in claim 10, including the step of forming the connector and the nipple of the same material and forming at least an outer surface of the metal seal from material including one of a gold and silver material.

\* \* \* \* \*